US005689821A

United States Patent [19]

Shimazaki

[11] Patent Number: 5,689,821

[45] Date of Patent: Nov. 18, 1997

[54] DEVICE FOR CONTROLLING EXTENSION AND RETRACTION OF AN ANTENNA

[75] Inventor: Mamoru Shimazaki, Tokyo, Japan

[73] Assignee: NEC Corporation, Tokyo, Japan

[21] Appl. No.: 365,309

[22] Filed: Dec. 28, 1994

[30] Foreign Application Priority Data

Dec. 28, 1993 [JP] Japan .................................... 5-337683

[51] Int. Cl.[6] ................................ H04B 1/38; H01Q 1/24

[52] U.S. Cl. .............................. 455/89; 455/90; 343/702; 343/703; 364/705.05

[58] Field of Search ................................ 455/97, 66, 269, 455/89, 90, 280, 289, 344, 351; 343/903, 703, 702, 823; 364/705.01, 705.05

[56] References Cited

U.S. PATENT DOCUMENTS

| | | | |
|---|---|---|---|
| 4,803,493 | 2/1989 | Jamison . | |
| 4,903,333 | 2/1990 | Aizawa | 455/269 |
| 4,954,828 | 9/1990 | Orr | 455/226 |
| 5,043,721 | 8/1991 | May | 340/825.44 |
| 5,212,725 | 5/1993 | Yamamoto et al. | 455/269 |
| 5,361,061 | 11/1994 | Mays et al. | 455/269 |

FOREIGN PATENT DOCUMENTS

| | | | |
|---|---|---|---|
| 62-136904 | 6/1987 | Japan . | |
| 1103323 | 4/1989 | Japan | 455/269 |
| 653848 | 2/1994 | Japan | 455/289 |

*Primary Examiner*—Reinhard J. Eisenzopf
*Assistant Examiner*—Thanh Le
*Attorney, Agent, or Firm*—Sughrue,Mion,Zinn,Macpeak & Seas, PLLC

[57] ABSTRACT

In an IC memory card radio modem including an antenna, intensity of electric field received by the antenna is measured by an electric field intensity detector. An antenna driver is controlled such that, when the electric field intensity exceeds a predetermined value, the antenna is retracted or is not risen. The antenna is extended when the electric field intensity is equal to or lower than the predetermined value.

26 Claims, 5 Drawing Sheets

DEVICE FOR CONTROLLING EXTENSION AND RETRACTION OF AN ANTENNA

BACKGROUND OF THE INVENTION

1. Field of the Invention

The present invention relates to an antenna, and more particularly, to a device and method for controlling extension and retraction of an antenna for an IC memory card radio modem.

2. Description of the Related art

A technique for executing extension and contraction of an antenna automatically is described in, for example, Japanese Patent Laid-Open Application No. 136904/1987 (JP-A-62-136904.)

When this automatic antenna extension/retraction technique is used in the environment of an IC memory card radio modem, an antenna of the IC memory card radio modem is extended automatically when the IC memory card radio modem is inserted into a personal computer. However, when the antenna is extended, it creates an obstacle for the user.

SUMMARY OF THE INVENTION

It is therefore an object of the present invention to provide a device and method for executing extension and retraction of an antenna in response to the electric field intensity of a receiving signal in order to reduce the amount of space occupied by the device.

In attaining the above object, an IC memory card radio modem including an antenna is inserted-into a personal computer in order to receive a signal, The antenna is extended or retracted in response to electric field intensity of the received signal. Preferably, the antenna is extended when the electric field intensity is low and the antenna is retracted when the electric field intensity is high.

A device for controlling extension and contraction of an antenna according to the present invention includes means for measuring the electric field intensity of a receiving signal and means for retracting the antenna when the measured electric field intensity exceeds a constant value. When the measured electric field intensity is not above the constant value, the antenna is extended.

A method for controlling extension and contraction of an antenna according to the present invention includes the steps of (1) measuring the electric field intensity of a received signal, (2) extending the antenna when the electric field intensity of the received signal is not above a predetermined constant value and (3) retracting the antenna state when the electric field intensity of the received signal exceeds the constant value.

BRIEF DESCRIPTION OF THE DRAWINGS

The above and other objects, features and advantages of this invention will become more apparent from the following detailed description taken with the accompanying drawings in which.

Figure 1:
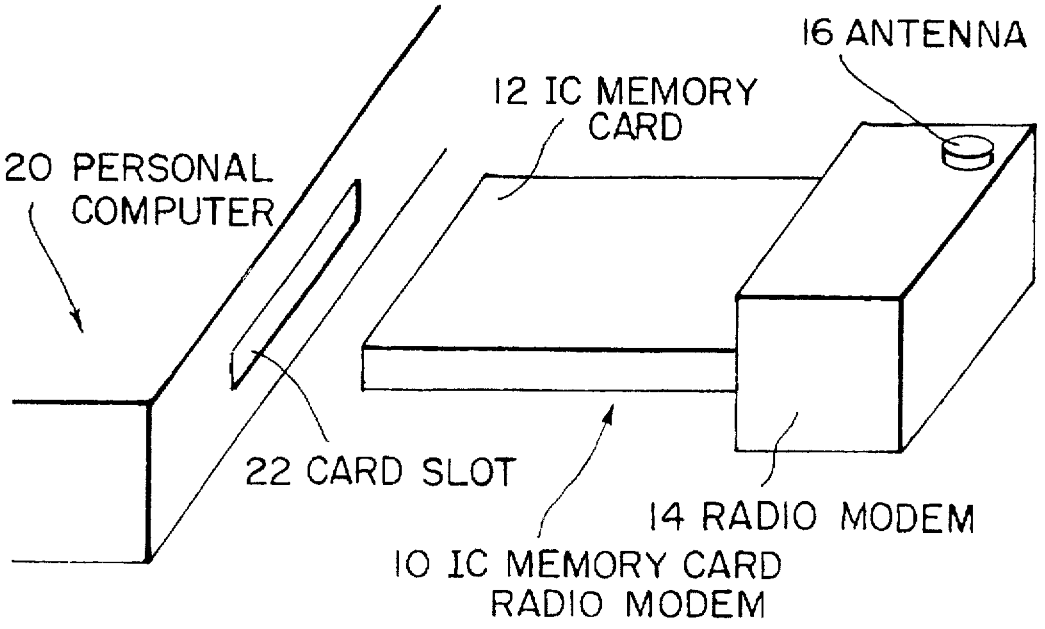
FIG. 1 is a diagram showing an IC memory card radio modem having an antenna of a preferred embodiment according to the present invention and a personal computer.
Figure 2:
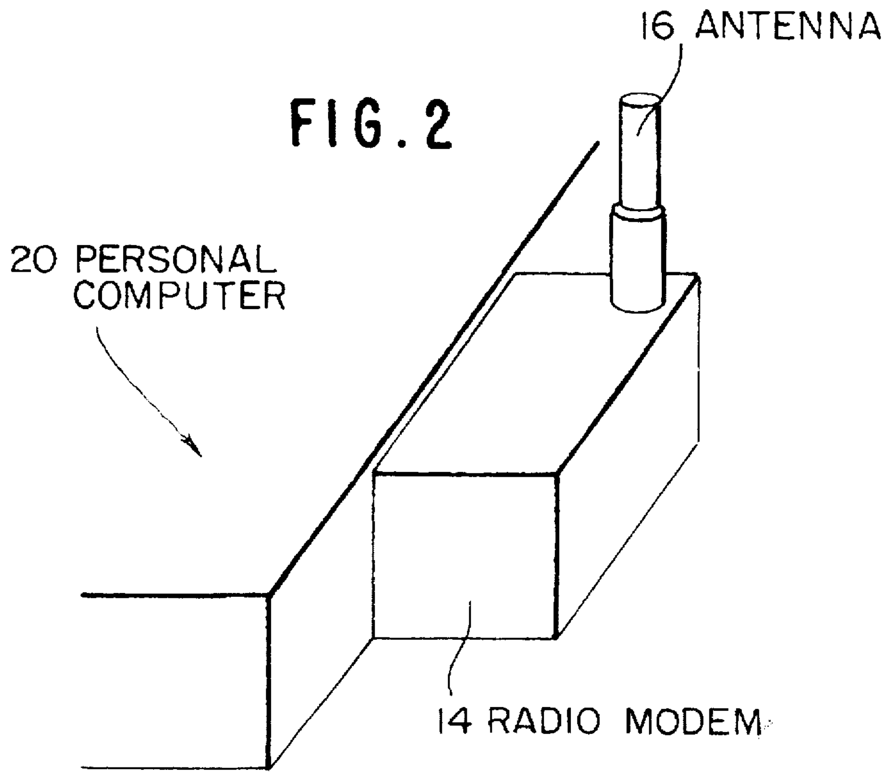
FIG. 2 is a diagram showing the IC memory card radio modem of FIG. 1 with the antenna in the extended position inserted into the computer of FIG. 1.
Figure 4:
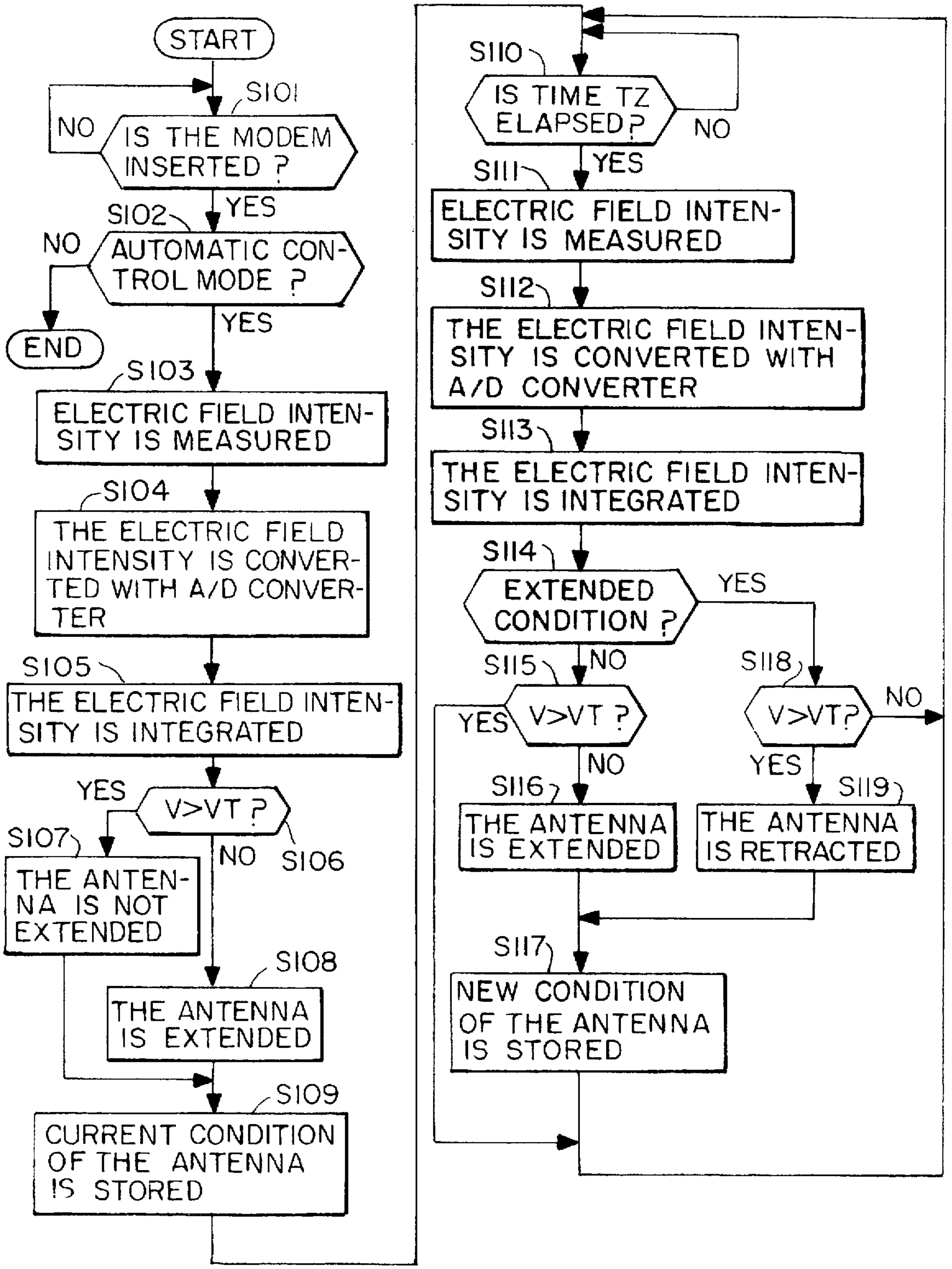
Figure 5:
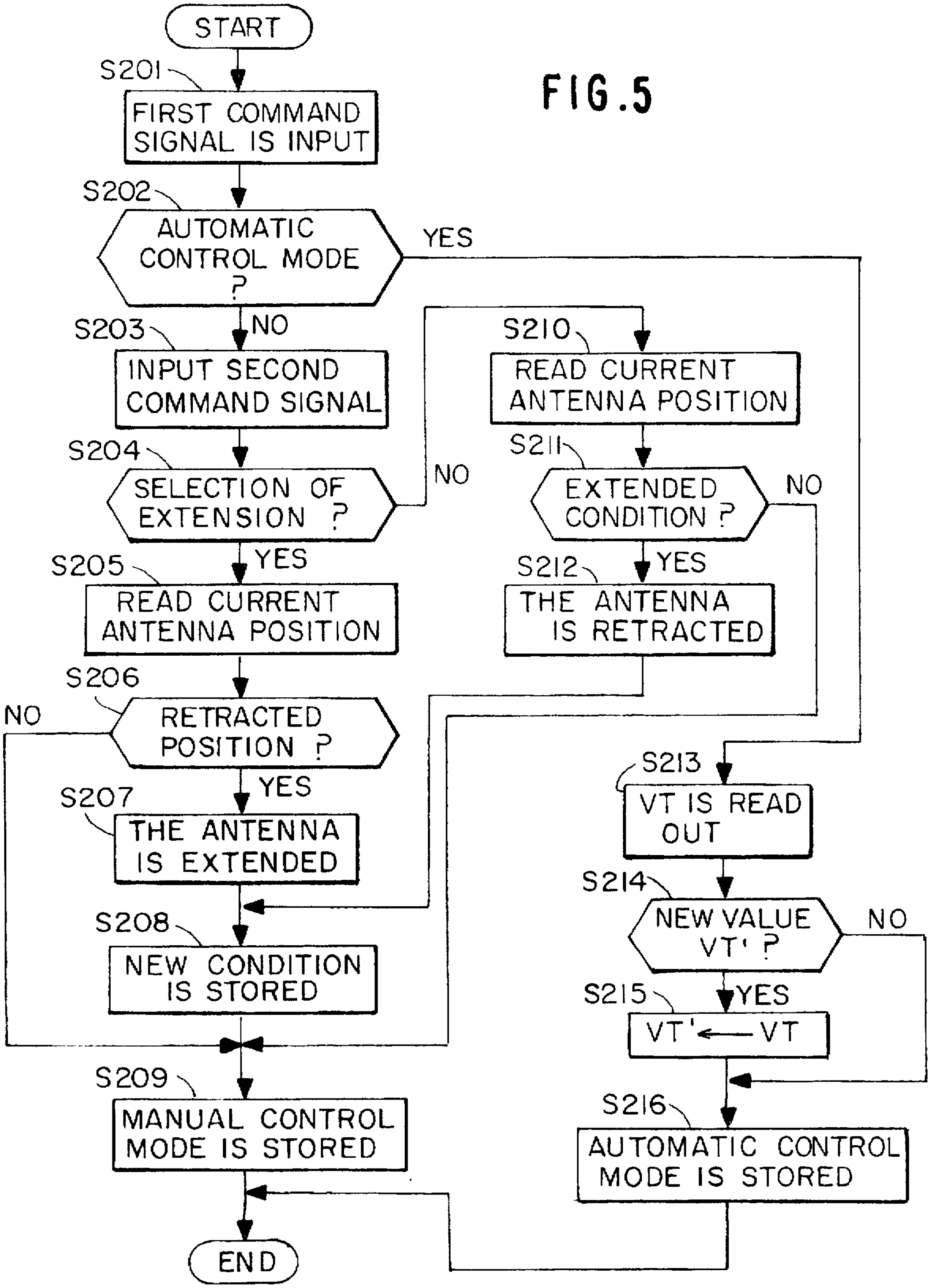
Figure 6A:
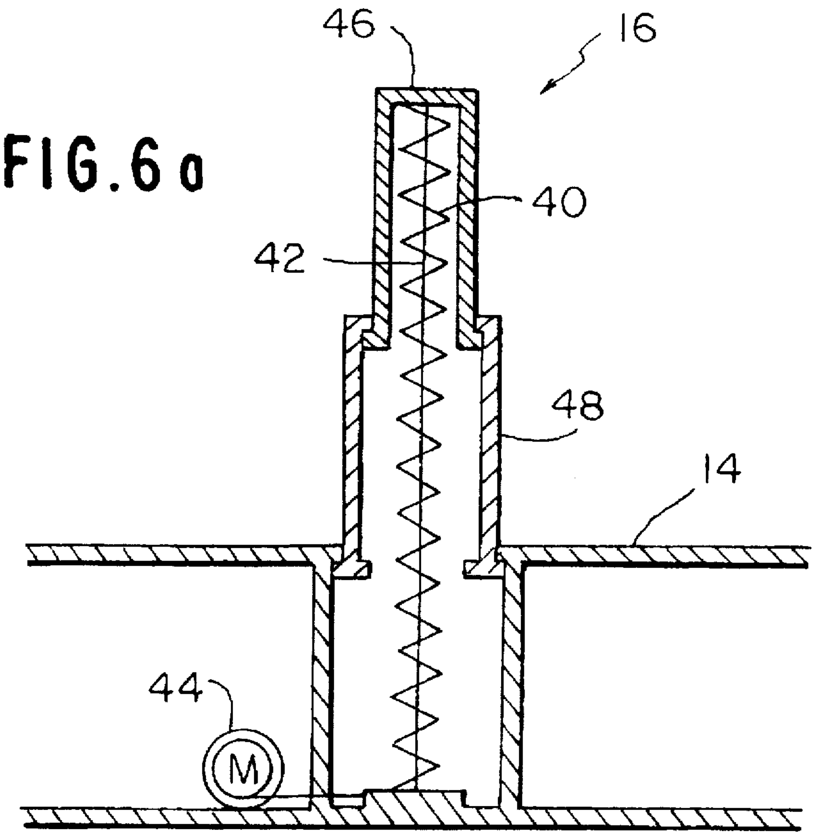
Figure 6B:
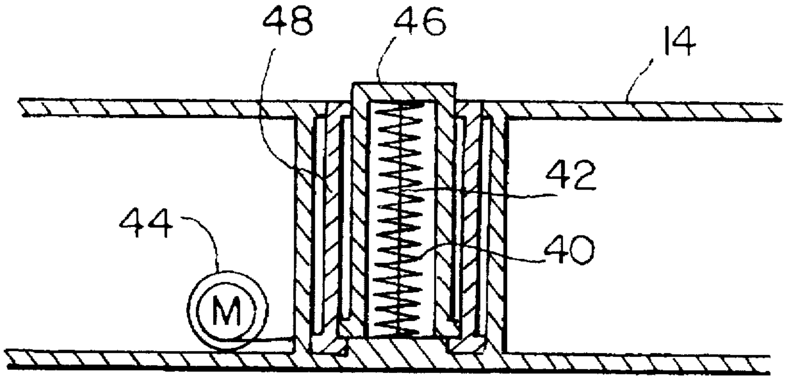

PIG. 3 is a block diagram of the preferred embodiment shown in FIG. 1 or 2;

FIG. 4 is a flowchart illustrating a control procedure of the antenna shown in FIG. 1 or 2 in an automatic control mode;

FIG. 5 is a flowchart illustrating a setting procedure of a predetermined value of the electric field intensity and a control procedure of the antenna in a manual control mode according to the present invention; and FIG. 6A–6B illustrates a structure of the antenna shown in FIG. 1 or 2.

In the drawings, the same reference numerals denote the same structural elements.

DESCRIPTION OF THE PREFERRED EMBODIMENT

FIG. 1 is an outer configuration showing an IC memory card radio modem having an antenna of a preferred embodiment according to the present invention and a personal computer. FIG. 2 is an outer configuration diagram showing the IC memory card radio modem inserted into a personal computer and showing the antenna extended.

In FIG. 1, an IC memory card radio modem 10 consists of an IC memory card portion 12, a radio modem portion 14 and an antenna 16. The personal computer 20 has a card slot 22 for receiving the IC memory card portion 12. When the IC memory card radio modem 10 is not inserted into a personal computer 20, the antenna 16 is retracted within the radio modem portion 14. When the IC memory card radio modem 10 is inserted into the personal computer 20, the electric field intensity of a received signal is measured and it is judged whether the antenna 16 should be extended in response to the measured electric field intensity as described after below. If the controller 2 judges that the antenna 16 should be extended in response to the measured electric field intensity, the antenna 16 is extended as shown in FIG. 2. Otherwise, the antenna 16 is maintained in the retracted position.

Figure 3:
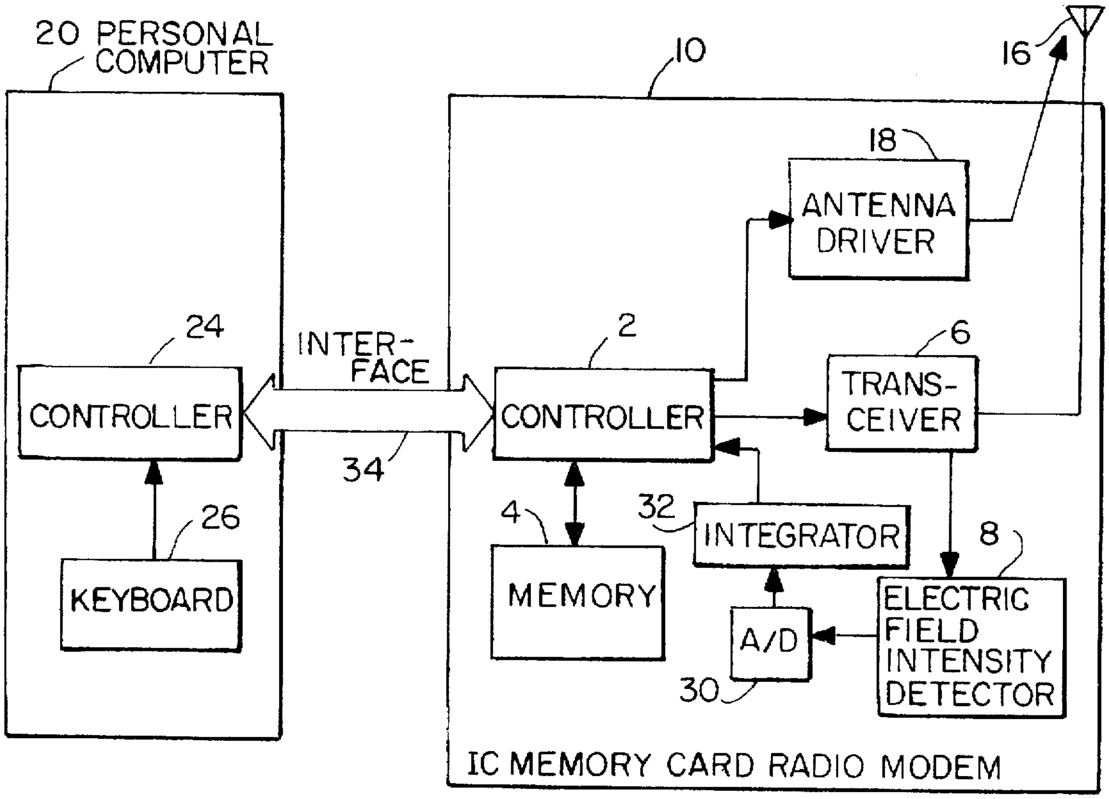

This operation will be described in detail with reference to FIGS. 3 and 4. FIG. 3 is a block diagram of the IC memory card radio modem 10 and the personal computer 20 shown in FIG. 1 or 2 and FIG. 4 is a flowchart illustrating a control procedure of the antenna 16 by the controller 2.

In FIG. 3, the IC memory card radio modem 10 includes a first controller 2, a memory 4, a transceiver 6, an electric field intensity detector 8, an antenna driver 18, an analog-to-digital (A/D) converter 30, and an integrator 32. The personal computer 20 includes a second controller 24 and a keyboard 26. An interface 34 is provided between the IC memory card radio modem 10 and the personal computer 20 to exchange information signals, such as a received signal of the antenna 16, a transmitting signal from the personal computer 20, a condition of the antenna 16, a current control mode, or a predetermined value to be compared with the measured electric field intensity.

There are two modes, an automatic control mode and a manual control mode for controlling the extension and retraction of the antenna 16. One of the two modes is set by the keyboard 26 and stored into the memory 4 through the controllers 2 and 24 and interface 34. The memory stores information signals, such as, the current condition of the antenna, e.g., a retracted condition or an extended condition, the automatic control mode or manual control mode, and a predetermined value for comparing with the measured electric field intensity to judge whether the antenna should be extended or retracted. The extension/retraction of the antenna 16 executed by the antenna driver 18 in response to an antenna extension/retraction command signal which is supplied via the keyboard 26 via the interface 34 and the controller 22.

As shown in FIG. 4, when the IC memory card radio modem 10 is inserted into the card slot 22 of the personal computer 20 (Step S101), the controller 2 judges whether or not the automatic control mode is set (Step S102.) If the manual control mode is set, the procedure proceeds to the end. If the automatic control mode is set, the electric field intensity of a received signal through the antenna 16 and the transceiver 6 is measured by the electric field intensity detector 8 (Step S103.) The measured electric field intensity is converted into a digital electric field intensity at the A/D converter 30 (Step S104.) The digital electric field intensity is integrated for a predetermined time T1 at the integrator 32 (Step S105.) Subsequently, the integrated electric field intensity V is compared with the predetermined value VT which is stored into the memory 4 (Step S106.) The predetermined value is preferably within a range in which the received signal is detected without error. In this case, the received signal is an error correcting coded signal. Otherwise, the predetermined value is freely set to become a reference for judging the electric field intensity of the received signal. When the integrated electric field intensity V exceeds the predetermined value VT, the antenna 16 is maintained in the retracted position (Step S107) and the current condition of the antenna, i.e., a retracted condition, is stored into the memory (Step S109.) If the integrated electric field intensity V is not above the predetermined value VT, the antenna 16 is extended (Step S108) and the current condition, i.e., an extended condition, is stored into the memory (Step S109.)

After a predetermined period T2 is elapsed (Step S110), the electric field intensity detector 8 measures the electric field intensity of the received signal (Step S111.) The measured electric field intensity is converted into a digital electric field intensity at the A/D converter 30 (Step S112) and integrated for the predetermined time T1 (Step S113.) Subsequently, the controller 2 detects the current condition of the antenna 16 (Step S114.) The current condition of the antenna 16 has been stored into the memory 4 in the step S109. When the antenna 16 is in the retracted condition, the step goes to step S115. On the other hand, when the antenna 16 is in an extended condition, the operation goes to step S118.

If the antenna is in the retracted condition, the integrated electric field intensity V is compared with the predetermined value VT (Step S115.) If the integrated electric field intensity V exceeds the predetermined value VT, the operation returns to step S110. If otherwise, the antenna 16 is extended (Step S116) end the stored condition of the antenna 16 is changed into an extended condition (Step S117.) If the antenna is in the extended condition in step S114, when the integrated electric field intensity V exceeds the predetermined value VT (Step S118), the antenna 16 is retracted (Step S119) and the new condition of the antenna 16 is stored into the memory 4 (Step S117.) When the integrated electric field intensity V is not above the predetermined value VT, the operation returns to step. S110.

In step S108 and S116, a control signal is sent to the antenna driver 18 to extend the antenna 16. In step S119, another control signal is sent from the controller 2 to the antenna driver 18 to retract the antenna 16. The antenna driver 18 responds to the control signals to extend or retract the antenna 16.

Although the predetermined period T2 is set in the above embodiment and the electric field intensity is detected periodically, the electric field intensity V may be always detected or may be detected in response to a detection command signal from the controller 2.

In addition, the measured electric field intensity may be compared with another predetermined value in order to simplify the procedure.

FIG. 5 is a flowchart illustrating a setting procedure of the predetermined value VT and a control procedure of the antenna in the manual control mode.

A first command signal for selecting the automatic control mode or the manual control mode is input from the keyboard 26 to the controller 2 via the controller 24 and interface 34 (Step S201.) When the first command signal is for the manual control mode (Step S202), a second command signal for selecting the extension or retraction of the antenna 16 is input from the keyboard 26 to the controller 2 similarly (Step S203.)

When the second command signal indicates the extension of the antenna 16 (Step S204), the controller 2 reads the current condition of the antenna 16 out of the memory 4 (Step S205.) If the stored current condition is a retracted condition (Step S206), the antenna 16 is extended by the antenna driver 18 (Step S207) and a new condition of the antenna 16, i.e., extended condition, is stored into the memory 4 (Step S208.)

Thereafter, the first command signal indicating the manual control mode is stored into the memory 4 (Step S209.) If the stored current condition is the extended condition in the step S206, the first command signal indicating the manual control mode is stored into the memory 4 (Step S209.)

When the second command signal indicates the retraction of the antenna 16 in step S204, the controller 2 reads the current condition of the antenna 16 out of the memory 4 (Step S210.) If the current condition is an extended condition (Step S211), the antenna 16 is retracted by the antenna driver 18 (Step S212) and a new condition of the antenna is stored into the memory 4 (Step S208.) Otherwise, the first command signal is stored into the memory 4 (Step S209.)

On the other hand, when the first command signal indicates the automatic control mode in step S202, a current predetermined value VT is read out of the memory 4 (Step S213.) If a third command signal indicating a new value VT' is input from the keyboard 26 (Step S214), the prior value of VT is changed to the new value VT' and the updated value of VT is stored into the memory 4 (Step S215.) Thereafter, the first command signal indicating the automatic control mode is stored into the memory 4 (Step S216.) Otherwise, in Step S214, the first command signal is stored into the memory 4 (Step S216).

As described before, although the predetermined value of the electric field intensity, which is used as a reference by the controller 2 in judging whether the antenna 16 is to be extended or retracted, is stored in the memory 4, it is possible to change the value freely by the personal computer 20 through the interface 34.

In addition, by transmitting a command signal of extension or retraction of the antenna 16 from the personal computer 20 to the controller 2, it is possible to extend or retract the antenna 16 regardless of a measured electric field intensity.

FIGS. 6(*a*) and 6(*b*) are a preferred structure of the antenna 16 in the extended condition and in the retracted condition, respectively. The antenna 16 includes a spring 40, a wire a motor 44, a projection 46 and a tube 48. An edge of the projection 46 and the motor 44, which is connected to the antenna driver 18, are connected by the wire 42. The spring 40 is connected to the edge of the projection 46 and a bottom of the radio modem 14. When the antenna 16 is extended as shown in FIG. 6(*a*), the projection 46 is pushed up by spring pressure of the spring 40. When the antenna 16 is retracted as shown in FIG. 6(*b*), the motor 44 winds up the wire 42.

Although FIG. 6 shows one example of extendable antenna, other types of antennas such as a foldable antenna may be used.

As described hereinbefore, according to the present invention, since the antenna is extended or retracted in response to a measured electric field intensity, the antenna is not always extended but extended only when it is necessary. Therefore, it is possible to provide a data communication service with a minimum space for the personal computer and the IC memory card radio modem with the antenna being retracted, in an environment of high electric field intensity.

Furthermore, since it is possible to extend or retract the antenna manually, there is an advantage that it can be operated according to demand of a user.

Although the embodiment has been described with respect to a specific arrangement, it goes without saying that the present invention is mot restricted to this case.

What is claimed is:

1. A communication device, which includes a body having a keyboard and a transceiver having an antenna, for operating extension and retraction of said antenna, comprising:

detecting means for detecting electric field intensity of a received signal when said transceiver is inserted into said body; and control means for controlling said extension and retraction of said antenna in response to said electric field intensity, wherein said antenna is retracted when said transceiver is inserted into said body and said control means controls an antenna condition from the retracted antenna condition.

2. The communication device as claimed in claim 1, wherein said control means retracts said antenna when said electric field intensity of said received signal exceeds a predetermined electric field intensity and extends said antenna when said electric field intensity is not above said predetermined electric field intensity.

3. The communication device as claimed in claim 2, wherein said detecting means comprises:

measuring means for measuring said electric field intensity of said received signal;

converting means for converting said measured electric field intensity into a digital electric field intensity; and integrating means for integrating said digital electric field intensity for a predetermined time.

4. The communication device as claimed in claim 3, wherein said control means comprises:

comparing means for comparing said integrated electric field intensity with a predetermined value;

operating means for operating said antenna to retract when said integrated electric field intensity exceeds said predetermined value and for operating said antenna to extend when said integrated electric field intensity is not above said predetermined value.

5. The communication device as claimed in claim 4, said control means further comprising:

memory means for storing an antenna position after said operating means operates said antenna.

6. The communication device as claimed in claim 4, wherein said control means performs said measuring means, said converting means, said integrating means, said comparing means and said operating means at a predetermined interval.

7. The communication device as claimed in claim 4, said control means further comprising: memory means for storing said predetermined value.

8. The communication device as claimed in claim 7, further comprising:

means for rewriting said predetermined value to a different value and for storing said different value into said memory means.

9. The communication device as claimed in claim 4, wherein said communication device further comprises an IC memory card radio modem for a computer.

10. The communication device as claimed in claim 9, wherein said comparing means compares said integrated electric field intensity with said predetermined value when said IC memory card radio modem is mounted on said computer.

11. The communication device as claimed in claim 1, further comprising:

operating means for operating said extension and retraction of a antenna in response to a command signal from said computer.

12. The communication device as claimed in claim 11, wherein said operating means comprises:

receiving means for receiving said command signal indicating one of said extension and said retraction;

extending means for extending said antenna when said command signal indicates said extension and a current antenna position is in a retracted position;

retracting means for retracting said antenna when said command signal indicates said retraction and said current antenna position is in an extended position; and storing means for storing a new antenna position.

13. The communication device as claimed in claim 1, wherein said communication device performs operations of said detecting means and said control means every time a predetermined time elapses.

14. The communication device as claimed in claim 11, further comprising:

switching means for selecting one of operations of said operating means, and said detecting and said control means.

15. The communication device as claimed in claim 14, wherein said operating means comprises:

receiving means for receiving said command signal indicating one of said extension and said retraction;

extending means for extending said antenna when said command signal indicates said extension and a current antenna position is in a retracted position;

retracting means for retracting said antenna when said command signal indicates said retraction and said current antenna position is in an extended position; and storing means for storing a new antenna position.

16. A communication device including a body having a keyboard and a transceiver having an antenna, inserted into said body, comprising:

means for detecting electric field intensity of a signal received by said antenna when said transceiver is inserted into said body; and driving means for operating one of an extension and retraction of said antenna in response to said electric field intensity, whereby said antenna is retracted when said signal is received thereby reducing the amount of space occupied by said communication device, wherein said antenna is retracted when said transceiver is inserted into said body and said driving means operates an antenna condition from the retracted antenna condition.

17. A method for controlling extension and retraction of an antenna in a communication device having a body and a transceiver, the method comprising the steps of:

detecting electric field intensity of a signal received by said antenna when said transceiver is inserted into said body;

comparing a detected electric field intensity with a predetermined value; and controlling said extension and retraction of said antenna in response to a result of said comparing step, wherein said antenna is retracted when said transceiver is inserted into said body and said controlling step controls an antenna condition from a retracted antenna condition.

18. The method for controlling as claimed in claim 17, the method further comprising the steps of:

retracting said antenna when said detected electric field intensity exceeds said predetermined value and extending said antenna when said detected electric field intensity is not above said predetermined value.

19. The method for controlling as claimed in claim 18, the method further comprising the steps of:

performing said detecting, comparing, and controlling steps every time a predetermined time elapses.

20. The method for controlling as claimed in claim 17, the method further comprising the steps of:

storing a current condition of said antenna after said controlling step.

21. The method for controlling as claimed in claim 17, the method further comprising the steps of:

updating said predetermined value.

22. A method for controlling extension and retraction of an antenna in a communication device having a body and a transceiver, the method comprising the steps of:

measuring electric field intensity of a signal received by said antenna when said transceiver is inserted into said body;

converting said measuring electric field intensity into a digital electric field intensity;

integrating said digital electric field intensity for a predetermined time;

comparing said integrated electric field intensity with a predetermined value; and controlling said extension and retraction of said antenna in response to the result of comparing, wherein said antenna is retracted when said transceiver is inserted into said body and said controlling step controls an antenna condition from a retracted antenna condition.

23. The method for controlling as claimed in claim 23, wherein said controlling step comprises:

retracting said antenna when said electric field intensity exceeds said predetermined value and extending said antenna when said electric field intensity is not above said predetermined value.

24. The method for controlling as claimed in claim 23, the method further comprising the steps of:

performing said measuring, converting, integrating, comparing, and controlling steps every time a predetermined time elapses.

25. The method for controlling as claimed in claim 21, the method further comprising the step of:

operating said extension and retraction of said antenna in response to a command signal.

26. The method for controlling as claimed in claim 25, the method further comprising the steps of:

switching between said operating step and said measuring, converting, integrating, comparing, and controlling steps.

* * * * *

UNITED STATES PATENT AND TRADEMARK OFFICE
CERTIFICATE OF CORRECTION

PATENT NO. : 5,689,821
DATED : November 18, 1997
INVENTOR(S) : Mamoru SHIMAZAKI

It is certified that error(s) appears in the above-identified patent and that said Letters Patent is hereby corrected as shown below:

Column 2, line 62, after "16" insert --may also be--.

Column 3, line 44, change "end" to --and--.

Signed and Sealed this

Twenty-first Day of April, 1998

Attest:

BRUCE LEHMAN

*Attesting Officer*

*Commissioner of Patents and Trademarks*